July 13, 1954

J. D. McGHEE 2,683,564

MEASURING APPARATUS

Filed Dec. 16, 1950

INVENTOR.
JOHN D. McGHEE

BY Arthur H. Swanson

ATTORNEY.

July 13, 1954

J. D. McGHEE 2,683,564

MEASURING APPARATUS

Filed Dec. 16, 1950

INVENTOR.
JOHN D. McGHEE
BY
Arthur H. Swanson
ATTORNEY.

July 13, 1954  J. D. McGHEE  2,683,564
MEASURING APPARATUS
Filed Dec. 16, 1950  4 Sheets-Sheet 3

INVENTOR.
JOHN D. McGHEE
BY Arthur H. Swanson
ATTORNEY.

July 13, 1954  J. D. McGHEE  2,683,564
MEASURING APPARATUS
Filed Dec. 16, 1950
4 Sheets-Sheet 4
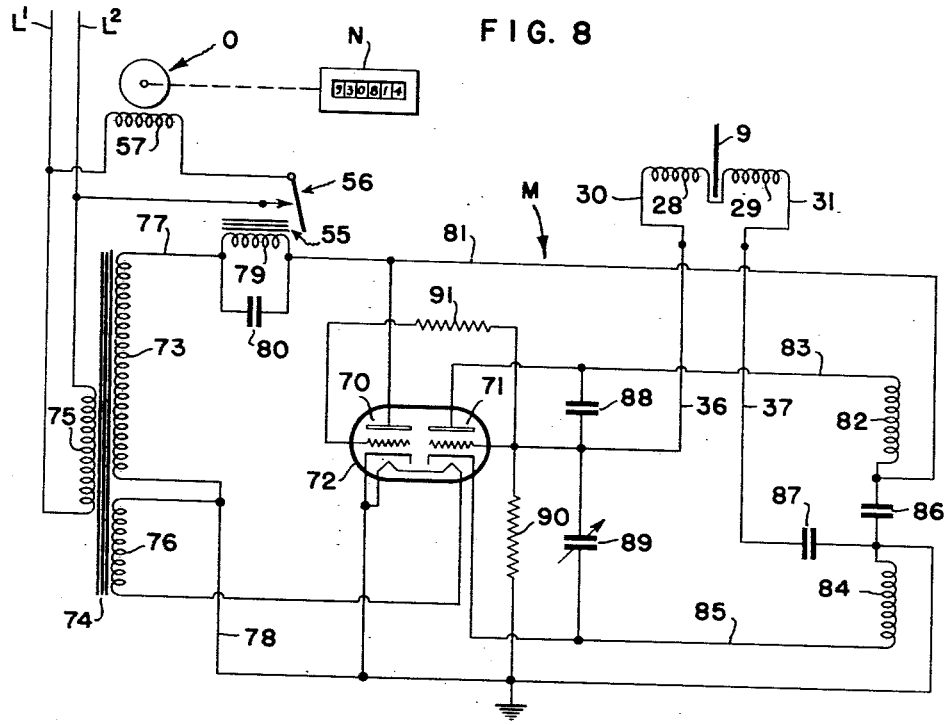
FIG. 8
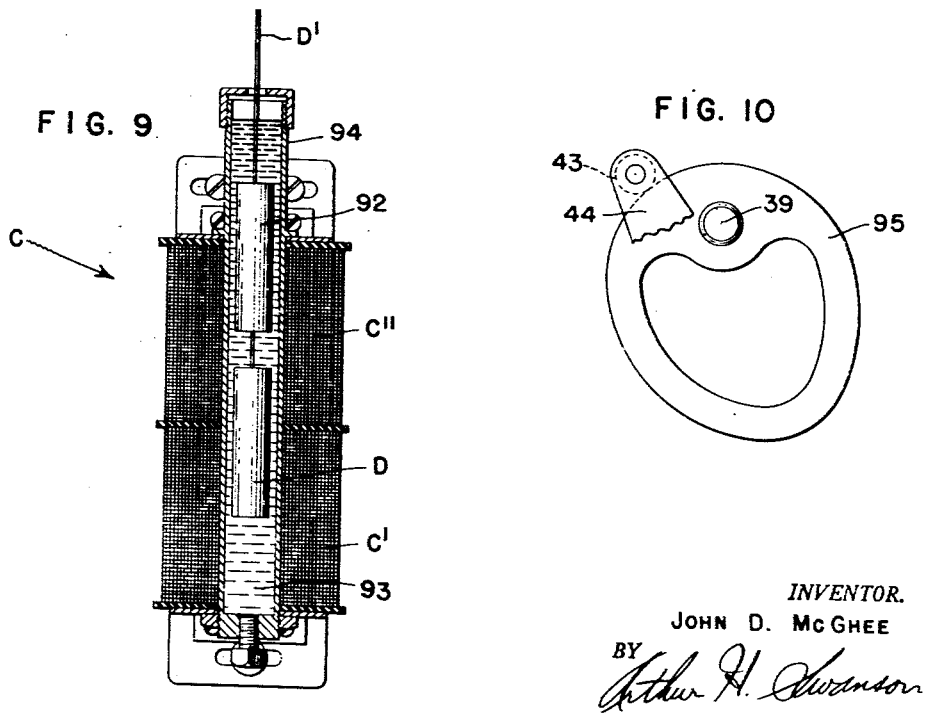
FIG. 9
FIG. 10
INVENTOR.
JOHN D. McGHEE
BY Arthur H. Swanson
ATTORNEY.

Patented July 13, 1954

2,683,564

UNITED STATES PATENT OFFICE 2,683,564

MEASURING APPARATUS

John D. McGhee, Philadelphia, Pa., assignor to Minneapolis-Honeywell Regulator Company, Minneapolis, Minn., a corporation of Delaware Application December 16, 1950, Serial No. 201,083

10 Claims. (Cl. 235—61)

The general object of the present invention is to provide novel electrical means for producing effects during portions of regularly repeated cycles which vary in predetermined correspondence with the value of a variable quantity and are indicative of said value.

The invention in its preferred form of embodiment, comprises one element given to and fro movements with predetermined frequency between positions at the ends of a path of movement, and comprises a second element movable into different positions along said path and cooperating with the first mentioned element to create one control effect when said one element comes into proximity with the second element while moving in one direction, and to create a second control effect when said one element passes out of proximity with said second element while moving in the opposite direction. In the specific form of the invention illustrated, the said one element comprises a pair of coils which are in mutual inductive relation, and the other element is a vane movable relative to the coils into and out of a position in which it is in proximity to the coils and reduces their mutual inductance. The coils are connected in an electronic circuit network which also includes an oscillator. The latter is maintained in an oscillatory condition when said coils are remote from said vane, and is prevented from oscillating by the reduction in the mutual inductance of the coils produced when the coils are in proximity to said vane.

A more specific object of the invention is to provide an improved integrating mechanism for use in integrating the average value of a variable quantity. In my improved integrating mechanism I advantageously make use of the apparatus hereinbefore described, and control the actuation of the integrating mechanism through the above mentioned electronic circuit.

My improved integrating mechanism is of a known type, sometimes referred to as the "impulse-duration" type, in which a counting train is intermittently operated during a variable operating interval in, or portion of, each of successive time periods of the same length, the duration of each of said operating intervals being proportional to the value of the said quantity during that interval. An early form of such an integrating mechanism is disclosed in the Harrison Patent 1,743,853, of January 14, 1930.

My improved integrating mechanism is characterized by the relatively high frequency of the successive periods, which may follow one another at ten second intervals, and a primary object of the present invention is to provide an integrating mechanism of the above mentioned type, which includes an electronic circuit network for rapidly energizing and de-energizing a self-starting, synchronous, counter-driving, A. C. motor, at the beginning and end, respectively, of each operating interval.

A specific object of the invention is to provide simple and effective means for varying the impedance in an oscillating circuit network so as to interrupt and re-establish oscillation in said circuit at the beginning and end of each of said operating intervals, without use of switch means for opening or closing a network circuit.

The various features of novelty which characterize my invention are pointed out with particularity in the claims annexed to and forming part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 8 illustrates an electric circuit network through which the operation of the counter driving motor is controlled;

Fig. 9 is a sectional elevation of a solenoid armature shown in Fig. 1; and

Fig. 10 illustrates a modification of a portion of the scanner mechanism.

Figure 1:
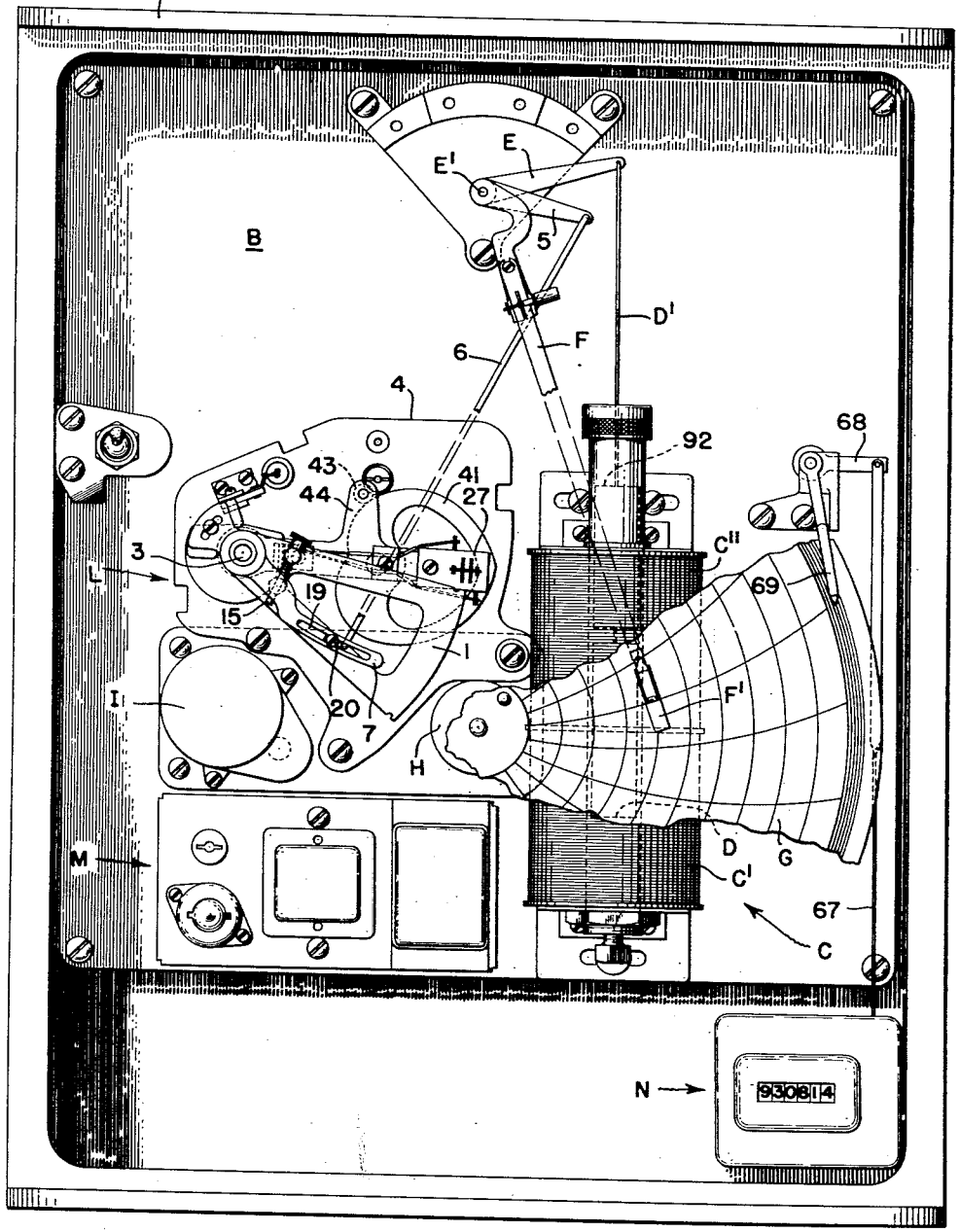
Fig. 1 is an elevation, with parts broken away, of a recording and integrating instrument.

In Figs. 1 to 9 I have illustrated a desirable form of my novel integrator mechanism included in a recording instrument A of known type for use in integrating the value of the quantity recorded by the instrument. The instrument A comprises a housing or casing enclosing integrating and recording mechanisms which have their various elements supported by the instrument casing directly, or through a detachable plate B. The recording instrument shown, is of the type in which the value of the quantity to be recorded is transmitted to a receiver element C, included in the instrument, from measuring apparatus external to the instrument, by means of an impedance bridge circuit including said receiver, and including a transmitting element, not shown, which is external to the instrument and is associated with said measuring apparatus. The impedance bridge circuit may be, for example, of the type and form disclosed in the previously mentioned Harrison Patent 1,743,853.

The receiver C comprises two windings C' and C'', which form two arms of the impedance bridge circuit, and are mechanically connected end to end to form a solenoid. The latter surrounds an armature D which is moved axially of the solenoid by variations in the relative values of the alternating currents flowing through the windings C' and C''. The armature D is connected through a link D' to a rocker arm E mounted on the plate B to work about a pivot E'. The rocker arm E is rigidly connected to a pen arm F which carries a pen F' arranged to record the deflections of the pen arm on a chart G. Advantageously, means are provided for balancing the weight of the armature D without significantly increasing the inertia of the apparatus moved by the armature. One form of such balancing means is shown in Fig. 9 and hereinafter described. The chart G is rotated by a chart supporting element H connected by a gear train including gear elements J, J', J$^2$ and J$^3$, to the rotor of a constant speed chart motor I. As shown, the rotating chart support H, motor I and gears J—J$^3$, are mounted on a plate K detachably secured to the main supporting plate B. Insofar as it has been described, the instrument A is of a conventional type used to record the varying values of various quantities, such as pressures, temperatures, and fluid rates of flow. For the purposes of the present invention in the form shown in Figs. 1 to 9, however, it is essential that the associated measuring apparatus should be of a type operative to move the core armature D in linear proportion to the variations in the value of the quantity measured.

The integrating mechanism included in the instrument A comprises three main elements, namely, a scanner mechanism L, a circuit network M including an oscillator, and a revolution counter N. As is hereinafter explained in more detail, the revolution counter is actuated through speed reducing gears by a synchronous motor O which is energized and de-energized as the scanner mechanism respectively interrupts and reestablishes oscillation of the oscillator at the beginning and end of each operating interval.

In the preferred construction shown, the scanner mechanism comprises a vane element 1 and a follower arm element 2, each pivoted for independent oscillatory movements about the axis of a post or pivot element 3. The latter has one end attached to a scanner supporting plate 4. As shown, the latter is screw connected to the plate K. The vane 1 is angularly adjusted about the post 3 on and in accordance with the deflections of the pen arm F. To this end, as shown, an arm 5 is rigidly connected to the rocker E and has its free end connected by a link 6 to a connector arm 7, which is rigidly, but adjustably, connected to the vane element 1.

The vane 1 is shown as in the form of a sheet metal sector with a stiffening transverse flange 8 extending along the radial edges of the sector and along the curved edge of the sector adjacent the post 3. At its other end, the vane element 1 is formed with a transverse flange 9 in the form of a section of a cylinder. The flange 9 constitutes the circuit controlling, or functional, portion of the vane element 1. In the construction shown, the post 3 is formed with an axial passage, and the vane 1 is rigidly attached to a hub like part 11 rigidly secured by a set screw 12 to a shaft 13 journalled in the hollow post 3 and normally held against axial displacement by a locking element 14. The previously mentioned connector arm 7 is mounted on the hub 11 for angular adjustment about the axis of the post 3 relative to the vane element 1. Such adjustment is effected by means of a screw 15 having a knurled head at one end and having an intermediate shank portion extending through a lateral projection 16 from the vane element 1, and having an end portion extending through and in threaded engagement with a nutlike element 17 which is swivel connected to the connector arm 7. A spring 18 surrounds the portion of the screw 15 between the parts 16 and 17, and biases the part 17 for movement away from the part 16 when the screw 15 is rotated in one direction, and permits the part 17 to move toward the part 16 when the screw is rotated in the opposite direction.

The connector arm 7 is formed with an arc shaped slot 19 substantially coaxial with the pivot connection between the arm 5 and the link 6. The pivot connection between the arm 7 and the link 6 includes a pivot pin support 20, which is directly pivoted to the adjacent end of the arm 6 and is mounted in the slot 19 for adjustment along the length of the latter. The support 20 is normally clamped to the arm 7 in a selected portion of the slot 19, by a clamping screw 21. The adjustments effected by means of the screw 15, and through the slidable part 20, are calibrating adjustments. The adjustment of the part 20 along the slot 19 varies the ratio of the angular movements of the vane element 1 to the angular movement of the pen arm. The adjustment effected by the screw 15 varies the angular relation between the vane element 1 and the follower arm 2.

The follower arm 2 comprises a metallic arm portion secured to a hub part 25 which is journalled on the post 3 and is surrounded by a body of insulating material 26. At its free end, the arm 2 carries a variable inductance element 27 which includes a pair of inductance coils 28 and 29. As is clearly shown in Fig. 2, the coils 28 and 29 are parallel to one another and are tangential to circles coaxial with the post 3 and at different radial distances from the axis of the latter. The coils 28 and 29 and the vane flange 9 are at such respective radial distances from the axis of the post 3, that when the relative positions of the arms 1 and 2 are such that the flange 9 extends between the coils 28 and 29, the flange reduces the mutual inductance of said coils.

As is shown diagrammatically in Fig. 8 each of the coils 28 and 29 has one terminal connected to one terminal of the other. The second terminals of the coils 28 and 29 are in the form of conductors 30 and 31 having taut portions adjacent said coils and secured to a portion of the arm 2 adjacent the element 27 by clamping means 32 and passing to and through a laminated insulation body 33 attached to the insulation body 26. The remaining portions of the conductors 30 and 31 partially encircle the body 26, being received in separate peripheral grooves 34 of said body, and have their ends mechanically connected to a terminal block 35 attached to the plate 4. At said terminal block, the conductors 30 and 31 are connected to conductors 36 and 37, respectively, through which the coils 28 and 29 are operatively included in the oscillator circuit network shown in Fig. 8. The portion of the grooves 34 separately receiving portions of the terminal conductors 30 and 31 are of such depth, and the intermediate portions of the conductors received in said grooves are of such length, that the side walls of the grooves serve as guides which retain the intermediate portions of the conductors in the grooves and effectively insulate each terminal conductor from the other.

Figure 2:
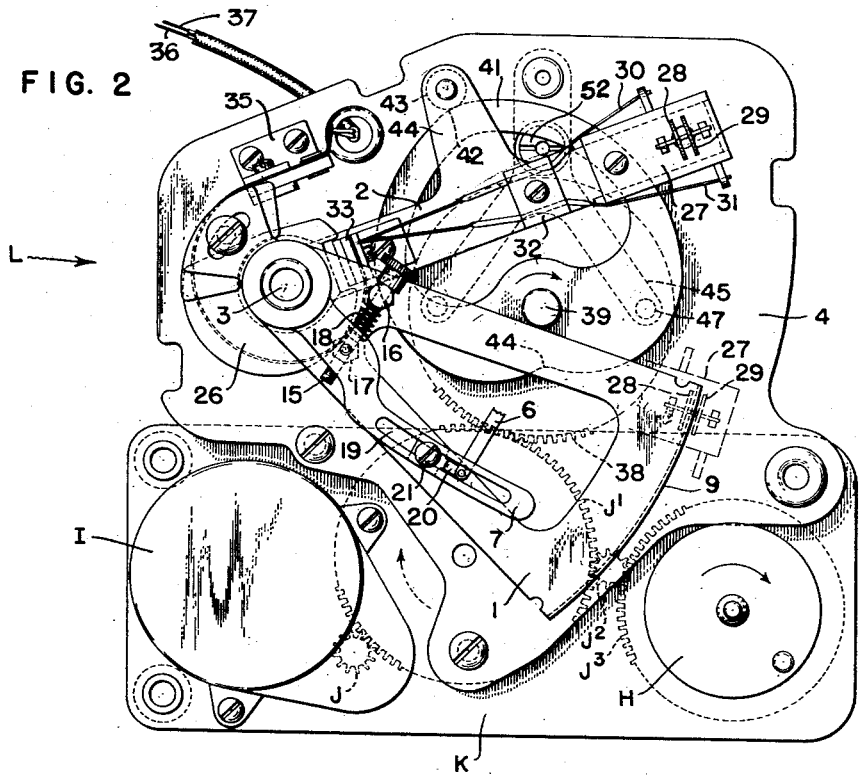
Fig. 2 is an elevation of a scanner mechanism included in the instrument and an associated chart drive mechanism, shown on a smaller scale and in less detail in Fig. 1.
Figure 3:
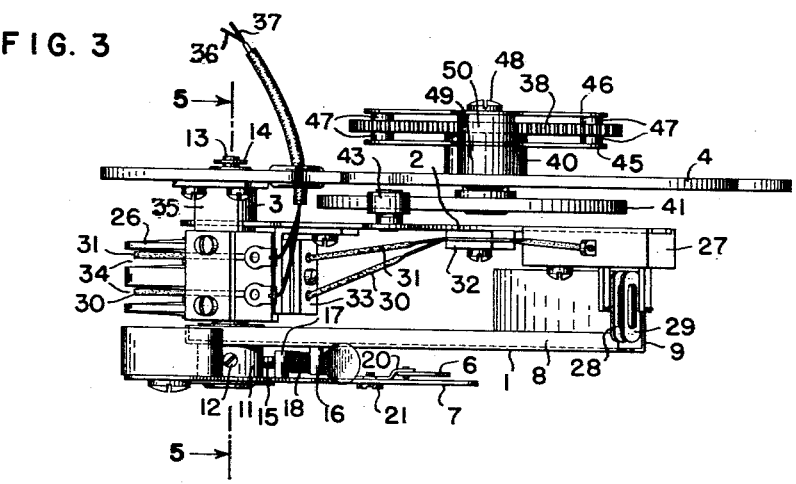
Fig. 3 is a plan view of the scanner mechanism shown in Fig. 2.
Figure 4:
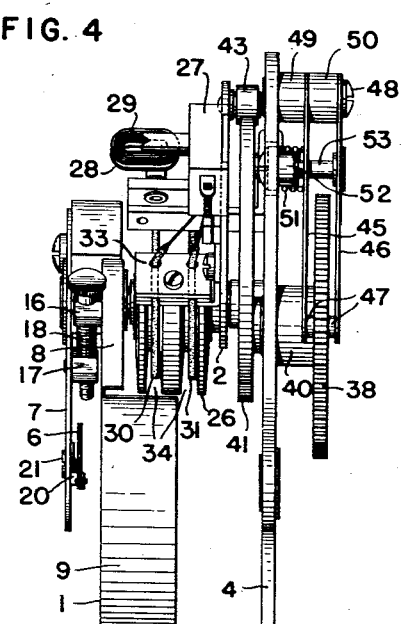
Fig. 4 is an elevation of the scanner mechanism taken at right angles to Fig. 2.
Figure 5:
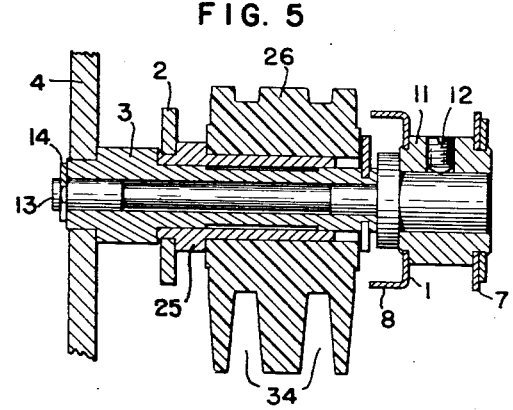
Fig. 5 is a partial section on the line 5—5 of Fig. 3.
Figure 6:
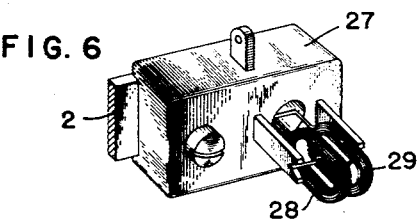
Fig. 6 is a perspective view of a portion of the scanner mechanism.

The arm 2 is given to and fro oscillatory movements between the end positions of the arm shown in full and dotted lines in Fig. 2. In the arrangement shown in Fig. 2, the oscillatory movements of the arm 2 are effected by the constant speed, chart driving, motor I. As shown, the gear J' included in the gear train through which the motor I rotates the chart support H, also meshes with and rotates a gear 38. The latter is mounted on a shaft 39 journalled in a bearing 40 carried by the stationary supporting plate 4. The shaft 39 has one end rigidly connected to the gear 38 and has its opposite end connected to an edge cam 41 of accurately formed or precision type, and of a form commonly referred to as heart shaped.

The cam 41 comprises a high portion 42, which is shown in Fig. 2 in the position in which it engages and supports a roller 43 pivotally connected to a lateral extension 44 of the arm 2. When the roller 43 is thus in engagement with the high portion of the cam 41, the arm 2 is held in its full line position shown in Fig. 2. As the cam 41 rotates in the counter-clockwise direction out of its position shown in Fig. 2, the arm 2 turns under the action of gravity from its full line position toward its dotted line position shown in Fig. 2. The arm 2 attains the last mentioned position when the low point 44 of the peripheral edge of the cam 41 is turned into the position in which it is engaged by, and supports the roller 43. As shown, the cam 41 has a portion between the shaft 39 and the high cam portion 42 cut away so that the center of gravity of the cam will be in or near the axis of cam rotation.

To insure smooth continuous motion of the cam 41, notwithstanding some back-lash tendency in the operation of the motor I, the rotation of the gear 38 is advantageously subjected to a stabilizing effect. That effect is produced as shown, by the use of a pair of brake elements 45 and 46 which engage the opposite sides of the gear 38 and subject the latter to a frictional retarding or braking action. As shown, each of the elements 45 and 46 comprises an apertured arm anchored to the plate 4, and comprises two other arms each carrying a pair of gear engaging braking pads 47. The pads 47 carried by each of the braking elements 45 and 46 engage portions of the gear 38 at opposite sides of, and at similar distances from, the axis of the gear.

As shown, the means through which the members 45 and 46 are anchored to the plate 4 comprises a clamping bolt 48 and spacing collars 49 and 50. The collar 49 spaces the member 45 away from the plate 4, and the collar 50 spaces the member 46 away from the member 45. The clamping bolt 48 extends through the apertured arms of the members 45 and 46, and through the collars 49 and 50 and is in threaded engagement with the plate 4. The pads 47 carried by the braking elements 45 and 46, subject the gear 38 to a retarding or braking action which may be regulated by suitable regulating means. The latter comprises means including a spring 51 interposed between the plate 4 and the member 45, and pressing the latter against the adjacent side of the gear 38. The spring 51 surrounds and is positioned by the cylindrical body portion of an internally threaded nut 52 which extends through the plate 4 and has an enlarged head which overlaps the portion of the plate 4 surrounding the passage through which the body of the nut 52 extends. A screw 53 extending through an opening in the member 45 has one end anchored to the member 46 and has its other end in threaded engagement with the nut 52. As is clearly shown in Fig. 4, the screw 53 is between the gear 38 and the clamping bolt 48, and the rotation of the nut 52 acts through the screw 53 to vary the spring pressure with which the pads 47 carried by the member 46 bear against the side of the gear 38 remoted from the plate 4.

Except when the value of the quantity measured is zero, the vane 1 will be displaced in the counter-clockwise direction from its zero position. As shown in Figs. 1 and 2, the position of the vane 1 corresponds to a pen displacement from zero of about forty percent of its full scale displacement. When the vane 1 is displaced from its zero position, each oscillatory movement of the arm 2 in the clockwise direction, as seen in Fig. 2, will cause the coils 28 and 29 to straddle the adjacent end of the flange 9 after the arm 2 has moved through a portion of its full clockwise range of movement, which increases as the counter-clockwise displacement of the vane 1 from its zero position is decreased. As previously noted, the flange 9 constitutes the operative or circuit controlling portion of the vane 1. A movement of the coils 28 and 29 clockwise relative to the flange 9 into the position in which the leading end edge of the flange 9 is approximately in position to intersect the common axis of the coils, interrupts the normal oscillatory condition of the oscillator circuit shown in Fig. 8.

The normal oscillatory condition of the oscillator is then interrupted as a result of a reduction in the mutual inductance of the coils 28 and 29 produced by the portion of the metal flange 9 interposed between the two coils. Further movement of the arm 2 in the clockwise direction, relative to the vane 1, will not significantly affect the condition of the oscillatory circuit. However, when the turning movement of the arm 2 is reversed, and the counter-clockwise movement of the arm 2 relative to the vane 1 displaces the leading end edge of the flange 9 in the clockwise direction from the common axis of the coils 28 and 29, the oscillatory condition of the oscillator is reestablished. As will be apparent, the duration of the period in which the oscillator is in its non-oscillatory condition will decrease and increase as the quantity value transmitted to the receiver C, causes the pen arm F to deflect in the clockwise or in the counter-clockwise direction, respectively, as seen in Fig. 1.

As is hereinafter explained, a relay 55 included in the oscillator circuit network, is operatively energized when the oscillatory condition of the oscillator is interrupted, and is deenergized when the oscillatory condition of the oscillator is reestablished. As diagrammatically shown in Fig. 8, the energization of the relay 55 closes a switch 56 and thus connects the winding 57 of the integrating motor O across alternating current supply conductors L' and L². When the switch 56 is closed, the motor O starts into rotation, and when the oscillatory condition of the oscillator is reestablished, the relay 55 is deenergized and the motion of the motor is interrupted. In the preferred form of the invention, the motor O is a synchronous motor of a known type operative to start into operation and attain its full speed within the time interval required for one or two cycles of alternation of the alternating current energizing the motor and having a frequency which ordinarily is 60 cycles per second. Thus, the time to start the motor O into operation at full speed will ordinarily be about .03 of a second or less.

Figure 7:
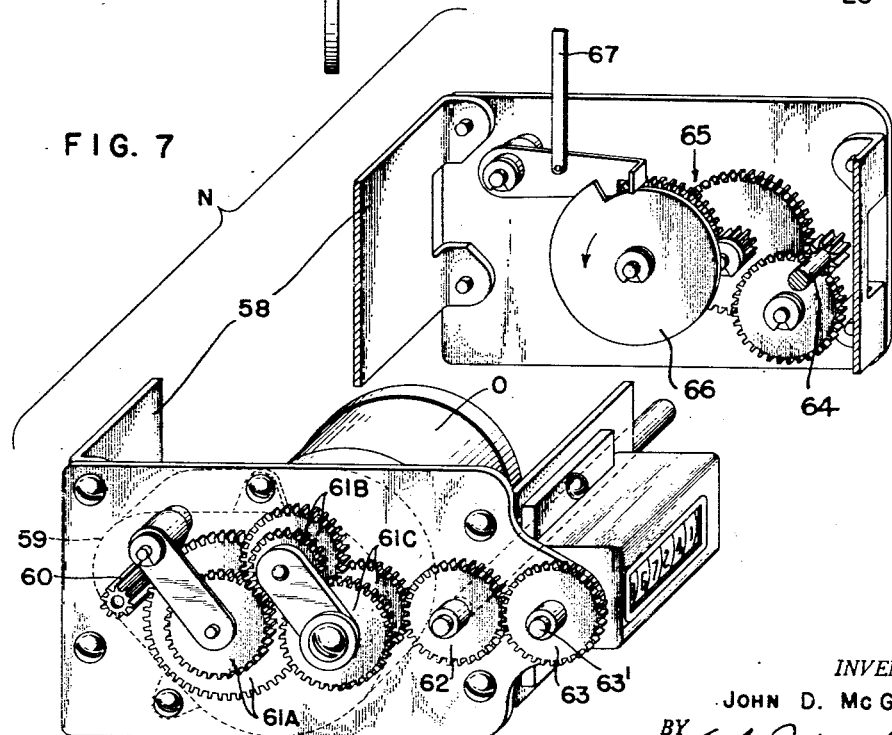
Fig. 7 is an exploded perspective view of the counter mechanism included in the instrument shown in Fig. 1.

As shown in Fig. 7, the revolution counter N and associated elements are mounted on and supported by, a framework 58. Said associated elements include the motor O, and the speed reducing gearing through which the motor O rotates a spur gear 63 attached to the actuating shaft 63' of the counter N. The motor O, operates through a speed reducing gear unit 59 to rotate a driving pinion 60. The latter rotates the gear 63 secured to the counter operating shaft 63' through a speed reducing gear train comprising gear units 61A, 61B, and 61C and gear 62. Each of said gear units comprises two coaxial spur gears staked to one another. One gear of the unit 61A is in mesh with one gear of unit 61B. The second gear of unit 61B is in mesh with one gear of the unit 61C, and the second gear of unit 61C is in mesh with the spur gear 62. The latter is in mesh with the gear 63.

A practically important characteristic of the gearing through which the motor O rotates the counter actuating shaft 63' is the accessibility of the gear units 61A, 61B, and 61C for ready replacement, and the relatively wide range of adjustments of the ratio of the speed of the motor O to the speed of the shaft 63' which can be effected by replacing the units shown by other units including spur gears of different diameters. In practice, it is readily possible to vary said ratio by replacement of said gear units from a maximum of about 16, to a minimum of about 2. Such a range of adjustment permits of any change in chart range and rate time unit which may be desirable under normal operating conditions.

The counterdriving mechanism shown in Fig. 7, includes a low speed shaft 64 which operates through a speed reducing gear train 65 and a cam 66 to gradually raise the lower end of a link 67 from a predetermined low position to a predetermined high position, and permits the link after being moved into its high position to immediately drop back into its low position. The link 67 is arranged to operate in a known manner through a lever 68 to so oscillate a pen 69 carried by the lever, as to make a saw tooth tally record of the value of the integrated quantity on the marginal portion of the chart G.

Fig. 8 illustrates a desirable arrangement of the circuit network M through which the movements of the flange 9 of the vane element 1 relative to the coils 28 and 29, control the energization and deenergization of the counter-drive motor O. The circuit network M shown in Fig. 8, comprises a pair of electronic triode valve elements 70 and 71 which may well be included in a single twin triode tube 72 of the commercially available 12AU7 type. The triode valves 70 and 71 are supplied with anode current by the secondary winding 73 of a transformer 74. The latter has its primary winding 75 connected across supply conductors L' and L². The secondary winding 76 of transformer 74 supplies heating current for the cathodes of the valves 70 and 71.

In the circuit arrangement shown in Fig. 8, the anodes of the valves 70 and 71 are connected to the terminal 77, and the cathodes of the valves are connected to the terminal 78 of the winding 73. As shown in Fig. 8, the terminal 77 is connected to said anodes through a conductor 81 which is connected to the terminal 77 through the winding 79 of the relay 55 and a condenser 80 in parallel with that winding. In Fig. 8, the conductor 81 is directly connected to the anode of the valve 70 and is connected to the anode of the valve 71 through an inductance 82 and a conductor 83. The terminal 78 is shown as directly connected to the cathode of the valve 70, and as connected to the cathode of the valve 71 through an inductance 84 and a conductor 85. The conductors 81 and 78, and thereby the inductances 82 and 84, are coupled by a condenser 86. The common junction of the conductor 78, inductance 84, and condenser 86, is connected to the control grid of the valve 71 by a circuit branch including a condenser 87, the conductors 37 and 31, the inductance coils 28 and 29, and the conductors 30 and 36. The anode and control grid of the valve 71 are connected by a condenser 88. The control grid and cathode of the valve 71 are connected by a variable, or trimming condenser 89. The control grid of the valve 71 is connected through a resistor 90 to the conductor 78 and to ground. The control grids of the valves 70 and 71 are connected by a resistance 91.

Except for its use in controlling the operation of the motor O, nothing in the circuit network M is claimed as novel herein. As those skilled in the art will recognize, the valve 71, inductances 82 and 84 and condensers 87, 88, and 89 form elements of a series fed oscillator, which is, or is not in condition to oscillate, accordingly as vane part 9 is respectively out of or in the space between the coils 28 and 29. The oscillator shown in Fig. 8 is of a type disclosed and claimed in the application of Warren Mooe, Jr., Ser. No. 106,796, filed July 26, 1949, now Patent No. 2,647,252 of July 28, 1953.

While the valve 70 does not oscillate, it supplies a component of the relay energizing current which ordinarily is as large or larger than the component of that current supplied by the valve 71. The valve 70 is controlled by the valve 71 through the connection between the control grids of the two valves. The amount of the relay current supplied by the valve 70 becomes significant only when the potential of the control grid of the valve 70 is increased relative to the cathode potential of that valve, as a result of the increase in the anode current of the valve 71. That increase occurs when the vane part 9 and the coils 28 and 29 cooperate to interrupt the oscillation of the oscillator including the valve 71. In respect to the conjoint use of an oscillator and a non-oscillator valve, the arrangement shown in Fig. 8 is of the type disclosed and claimed in Patent 2,564,937 of William H. Wanamaker, Jr., granted August 21, 1951, on application Ser. No. 694,401, filed August 31, 1946.

The previously mentioned means, shown in Fig. 9 for balancing the weight of the armature D of the receiver C, comprises a float 92 adjacent to, and coaxial with the armature D, and shown as connecting the armature to the lower end of the link D'. The armature D and float 92 are submerged in a liquid 93 which may be a stable oil having a relatively high specific gravity and is held in non-metallic tube 94 mounted in the bore of the receiver solenoid. The upper end of the tube 94 extends far enough above the solenoid so that with the maximum elevation attained by the armature D in regular operation, the float 92 will still be completely submerged in the liquid 93. The float 92 is formed of some non-magnetic material such as cork or balsa wood having a specific gravity substantially lower than that of the armature D and the liquid 93.

The volume and weights of the armature D and float 92 and the specific gravity of the liquid 93 should be so related that the armature and float collectively displace a volume of the liquid 93 which is equal in weight to the collective weight of the armature D and float 92. The practical effect of the float 92, arranged as described, is to neutralize the effect of the force of gravity, on the vertical position of the armature D without significantly increasing the weight or inertia of the apparatus moved by the armature D in response to variations in the currents flowing through the windings C' and C''.

As has long been known, when a fluid rate of flow is measured by measuring the pressure differences at opposite sides of a measuring orifice or restriction in a conduit through which the fluid flows, the pressure difference is substantially proportional to the square of the velocity of the fluid flow. When the pressures at the opposite sides of the measuring orifice are compared in a manometer, the latter may be specially shaped as is well known, so that the movement of the manometer float will be in linear proportion to the rate of fluid flow through the conduits. Such a manometer is adapted for use in actuating the movable element of the unillustrated transmitter associated with the portion of the impedance bridge receiver C, employed to adjust the rocker E, of Fig. 1.

Integrating apparatus of the general form and type shown in Figs. 1–9, may also be arranged to correctly integrate a fluid rate of flow, when the movement of the armature D is not a linear function of the velocity of flow, but is proportional to the square of the velocity of flow. This result may be obtainable with no modification of the apparatus shown in Figs. 1–9 other than the replacement of the cam 41 shown in Figs. 1 and 2, by the cam 95 of the character shown in Fig. 10. The cams 41 and 95 may be alike structurally, except in the form or shape of their peripheral edges, but they differ operatively.

The ultimate functional, or operative difference between the cams 41 and 95, is a difference in the angular speeds with which each moves an associated follower arm back and forth between its end positions in a predetermined time period. That period may well be the same for each cam, and in such case the average angular speeds of the follower arms respectively actuated by the two cams will be the same. In such case, however, the angular movement of the follower arm 2 through the portion of its path adjacent the upper end position of the arm, shown in full lines in Fig. 2, will be more rapid when the arm is moved by the cam 95 than when moved by the cam 41, and during the portion of the path adjacent the other end position of the arm 2, the angular movement of the latter will be more rapid when moved by the cam 41 than when moved by the cam 95.

The angular speed of the follower arm 2, when moved between its end positions by the cam 41 is necessarily constant, since the displacement of the vane element 1 from its zero position is in linear proportion to the value of the quantity measured. In consequence the aggregate to and fro distance through which the follower arm 2 moves between its position in which the coils 28 and 29 and the vane 9 cooperate to interrupt oscillation of the oscillator, and the position at which the oscillation of the oscillator is reestablished, must be in approximate linear proportion to the then existent value of the quantity measured and integrated. It should be in exact linear proportion to said value but for the fact that there is a small dead spot between the points at which the coils and vane cooperate with the relay to start and stop the counter-driving motor.

Under the condition in which the follower arm element 2 is moved by the cam 95, the displacement of the arm or vane element 1 from its zero position is not in linear proportion to the value of the quantity measured or integrated, but is proportional to the square, or second power, of the valve of the quantity measured and integrated. In consequence, the distance travelled by the follower arm 2 as it moves in either direction between the position in which the coils 28 and 29 cooperate with the vane 9 to interrupt oscillation of the oscillator, and the lower end position of the follower arm is approximately proportional to the square of the value or the quantity measured.

To enable it to make the duration of each period in which the oscillator is in its non-oscillatory condition approximately proportional to the then existing value of the quantity measured, the cam 95 must be shaped to continuously increase the angular velocity of the coil carrying arm 2 as the latter moves from its lower end position to its upper end position, shown in full lines in Fig. 2. During the return movement of the arm 2 from its upper end position to its lower end position, the angular speed of the arm must continuously decrease. Since the first derivative of a velocity is an acceleration and since the first derivative of a squared value or quantity is a constant, it follows that as the coil carrying element 2 moves toward its upper end position, its angular velocity must accelerate at a constant rate, and when the coil carrying element is moving away from its upper end position as seen in Fig. 2, its angular velocity must diminish or decelerate at a constant rate. Those familiar with the shaping of rotating edge cams will readily understand how to shape the cam 95 so that the velocity of the follower, or coil carrying arm 2 will vary at a constant rate as it moves the arm 2 in either direction between its end positions.

The general advantages of the invention are obtained as well when the displacement of the vane arm is proportional to the square of the quantity measured and integrated, as when the displacement is in linear proportion to said quantity. In either case, the primary advantage of the invention is the speeding up of the frequency with which those actions are repeated, and the shortening of the duration of the individual integrating periods. This contributes directly to increased accuracy by diminishing the error due to changes in the value of the quantity integrated during the periods in which the oscillator is in its non-oscillating condition. A change in one direction, followed by a change in the opposite direction in the value of the measured quantity, must result in an integeration error when both changes occur in a period in which the oscillator is in its non-oscillatory condition. In practice that error is usually small. Its reduction is desirable, however, and it is reduced by shortening the periods in which the integrating action is effected. In practice the time required for each cycle of operation in which the vane element moves away from and back into either end position, may well be of the order of ten seconds. This means that oscillation is interrupted or reestablished during each of the successive five second intervals.

The control of the periodical integrating actions by controlling the oscillation of an electrical oscillator generating R. F. signals to control the operation of a counter-operating motor which can start and stop in a small fraction of a second, contributes directly to a desirably high speed of operation, and to the use of relatively simple, compact, and inexpensive apparatus. No circuit breaking and making switch contacts are included in the oscillating circuit network. The winding of the relay 55 which opens and closes the energizing winding 57 of the integrating motor O, is tuned for rapid action.

The arrangement of the vane and coil carrying elements for independent movement of each toward and away from the other about a common axis, contributes to mechanical simplicity and ease of calibration, and facilitates the use of an impedance bridge in a compact instrument housing. Preferably, the apparatus should be calibrated and adjusted to insure the interruption of oscillation at approximately the instant at which the leading edge of the vane flange 9 intersects the common axis of the coils 28 and 29. This permits the attainment of optimum sensitivity when the trimming condenser 89 is properly adjusted. The previously described rapid change gears 61A, 61B, and 61C make it possible to provide decimal integrating factors for standard linear charts and flow rates of units per second, per minute, per hour and per day.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases, certain features of my invention may be used to advantage without a corresponding use of other features.

Having now described my invention, what I claim as new and desire to secure by Letters Patent, is:

1. Apparatus for producing effects timed in accordance with the variations in magnitude of a variable quantity, comprising in combination, a movable reactive impedance element, a second, separately movable element, an electronic circuit network including an oscillator connected to said impedance element and maintained by the latter in an oscillatory or in a non-oscillatory condition accordingly as the impedance of said impedance element has one value or a second value, said second element being arranged to cooperate with said impedance element in giving the impedance of said impedance element different values as the relative positions of said elements are varied, actuating means for moving one of said elements back and forth with a predetermined frequency between positions at the ends of a fixed path of movement, and adjusting means responsive to variations in said magnitude for adjusting the other element into positions along said path which vary in accordance with variations in said magnitude, said elements cooperating to give said impedance said one value as said one element moves in one direction into proximity with said other element, and to give said impedance said second value as said one element moves in the opposite direction out of proximity with said other element.

2. Apparatus as specified in claim 1, in which said one element is mounted to turn back and forth about an axis as it is moved between its end positions, and in which said other element is also mounted to turn about said axis as it is adjusted into its different positions.

3. Apparatus as specified in claim 2, in which said impedance element comprises a pair of coils arranged side-by-side with their axes substantially radial to the axis about which said element turns and separated from one another by a space tangential to said axis, and in which said second element comprises a metallic vane extending circularly about said axis and arranged to pass into and out of the space between said coils, and thereby vary the mutual inductance of the coils as said one element moves into and out of its positions relative to the other element, whereby said vane and coils cooperate to respectively interrupt and reestablish oscillation of said oscillator.

4. Apparatus as specified in claim 1, comprising a supporting structure including a pivot, and in which said one element is an arm having a hub portion of insulating material mounted on said pivot and formed with peripheral grooves, and in which said impedance element is secured to said arm at a distance from said pivot and has a pair of terminal conductors including portions adjacent said impedance element and attached to said arm and portions remote from said impedance element and attached to said structure and including intermediate portions received in said grooves with freedom to move therein relative to said arm as the latter turns back and forth on said pivot.

5. Apparatus as specified in claim 1, comprising a self-starting, synchronous, alternating current motor, having an energizing circuit and operative to develop full speed in a small fraction of one second when said energizing circuit is connected to a source of alternating current, and a relay included in said circuit network and operative to connect said energizing circuit to and disconnect it from a source of alternating current when the oscillation of said oscillator is respectively interrupted and reestablished.

6. Apparatus as specified in claim 1, which includes the receiving section of an impedance bridge comprising a vertically movable armature connected to said other element and includes inductive circuit means for moving said armature and thereby said other element, on and in accordance with variations in the magnitude of said variable quantity, and includes a body attached to said armature and having a lower specific gravity than said armature, and includes a container containing a body of liquid in which said armature and body are immersed, and in which the relative masses of said armature and body and the specific gravities of said armature, body and liquid are so related that the combined weight of the armature and body is approximately equal to the weight of said liquid displaced by said armature and body.

7. Apparatus as specified in claim 1, including an element continuously rotating in one direction and mechanically connected to said one element to give the latter its back and forth movements, and including braking means subjecting said continuously rotating means to a retarding force to thereby substantially eliminate backlash action of said continuously rotating element.

8. Apparatus as specified in claim 7, in which said continuously rotating element is a spur gear, and in which said braking means comprises a pair of juxtaposed resilient members one at each side of said spur gear and each having a first portion bearing against the adjacent side of said gear and a second portion displaced from the periphery of said spur gear, supporting means for holding the second portions of said elements in fixed positions, and tension means acting between portions of said resilient elements intermediate their first and second portions and regulating the contact pressures between said first portions and said spur gear.

9. An integrator of the impulse-duration type comprising in combination, supporting structure, a vane and an impedance element mounted in said structure for independent movement of each toward and away from the other along overlapping paths, vane adjusting means responsive to variations in a quantity to be integrated for adjusting said vane into positions along its path which vary in accordance with variations in said quantity, actuating means for moving said impedance element back and forth along its path with a predetermined frequency between fixed end positions and through an intermediate position which is dependent on the position of said vane and in which the latter increases the impedance of said impedance element as the latter moves in one direction through said intermediate position and decreases the impedance of said impedance element as the latter moves in the opposite direction through said intermediate position, an electronic network including an oscillator connected to said impedance and maintained by the latter in an oscillatory condition as said impedance element moves in one direction through said intermediate position and in a non-oscillating condition as said impedance element moves in the opposite direction through said intermediate position, and integrating means controlled by said oscillator and made operative or inoperative to effect an integrating action accordingly as said oscillator is maintained in one or in the other of said conditions.

10. An integrator as specified in claim 9, in which said integrating means includes a revolution counter, a synchronous, alternating current motor having an energizing circuit and adapted to quickly attain full speed and to stop when said circuit is respectively connected to and disconnected from a source of alternating current, a speed reducing gear train including change gears readily replaceable to affect predetermined variations in the ratio of motor speed to counter speed, and a relay mechanism included in said electronic circuit and operative to connect said energizing circuit to and disconnect it from a source of discontinuous current, as the oscillation of said oscillator is respectively interrupted and reestablished.

References Cited in the file of this patent

UNITED STATES PATENTS

| Number | Name | Date |
|---|---|---|
| 1,969,966 | Curtis | Aug. 14, 1934 |
| 2,052,764 | Harrison | Sept. 1, 1936 |
| 2,121,082 | Harrison | June 21, 1938 |
| 2,264,370 | Harrison | Dec. 2, 1941 |
| 2,332,954 | Trumbower | Oct. 26, 1943 |
| 2,435,880 | Eilenberger | Feb. 10, 1948 |